(12) United States Patent
Okada et al.

(10) Patent No.: US 10,995,934 B2
(45) Date of Patent: May 4, 2021

(54) OPTICAL COMPONENT INCLUDING A TRANSLUCENT SUBSTRATE FOR ADJUSTABLE LIGHT SCATTERING AND LIGHTING DEVICE INCLUDING THE SAME

(71) Applicant: NGK Insulators, Ltd., Nagoya (JP)

(72) Inventors: Naotake Okada, Anjo (JP); Jungo Kondo, Miyoshi (JP); Shoichiro Yamaguchi, Ichinomiya (JP); Iwao Ohwada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/458,563

(22) Filed: Jul. 1, 2019

(65) Prior Publication Data

US 2019/0323685 A1 Oct. 24, 2019

Related U.S. Application Data

(63) Continuation of application No. PCT/JP2017/041469, filed on Nov. 17, 2017.

(30) Foreign Application Priority Data

Jan. 18, 2017 (JP) ............................. JP2017-006504

(51) Int. Cl.
*F21V 9/32* (2018.01)
*F21V 29/70* (2015.01)
*F21Y 115/30* (2016.01)

(52) U.S. Cl.
CPC ............... *F21V 9/32* (2018.02); *F21V 29/70* (2015.01); *F21Y 2115/30* (2016.08)

(58) Field of Classification Search
CPC . G03B 21/204; F21Y 2101/00; F21V 29/502; F21V 9/30; F21V 9/00; H01S 5/022; G02B 5/20
See application file for complete search history.

(56) References Cited

U.S. PATENT DOCUMENTS

| 10,845,686 | B2 * | 11/2020 | Ikeo ...................... F21V 29/502 |
| 2002/0155944 | A1 | 10/2002 | Kurashima et al. |
| 2012/0001204 | A1 | 1/2012 | Jagt |
| 2013/0058114 | A1 | 3/2013 | Reiners |
| 2014/0027804 | A1 * | 1/2014 | Yoneda ................... H01L 24/18 257/98 |

(Continued)

FOREIGN PATENT DOCUMENTS

| CN | 105830237 A | 8/2016 | |
| EP | 2819188 A1 * | 12/2014 | ............. B23K 20/00 |

(Continued)

OTHER PUBLICATIONS

International Search Report and Written Opinion (PCT/JP2017/041469) dated Feb. 20, 2018.

(Continued)

*Primary Examiner* — Tracie Y Green
(74) *Attorney, Agent, or Firm* — Burr & Brown, PLLC

(57) ABSTRACT

An optical component includes a first substrate including a phosphor substrate and a second substrate including a translucent substrate and supporting the first substrate. The translucent substrate has a polycrystalline structure with orientation.

11 Claims, 6 Drawing Sheets

(56) References Cited

U.S. PATENT DOCUMENTS

| | | | |
|---|---|---|---|
| 2014/0071683 A1* | 3/2014 | Hamada | H01L 33/50 362/259 |
| 2015/0048398 A1* | 2/2015 | Ichikawa | H01L 33/501 257/98 |
| 2015/0372200 A1 | 12/2015 | Seko et al. | |
| 2016/0293800 A1 | 10/2016 | Watanabe et al. | |
| 2019/0309936 A1* | 10/2019 | Kondo | C04B 37/003 |

FOREIGN PATENT DOCUMENTS

| | | |
|---|---|---|
| EP | 3 086 378 A1 | 10/2016 |
| JP | H03-234790 A1 | 10/1991 |
| JP | 2002-293609 A1 | 10/2002 |
| JP | 2012-521066 A1 | 9/2012 |
| JP | 2016-063163 A1 | 4/2016 |
| JP | 2016-119361 A1 | 6/2016 |
| WO | 2011/141377 A1 | 11/2011 |

OTHER PUBLICATIONS

Extended European Search Report (Application No. 17892529.3) dated Feb. 25, 2020.
Chinese Office Action (Application No. 201780082068.0) dated Nov. 17, 2020.

* cited by examiner

F I G . 5
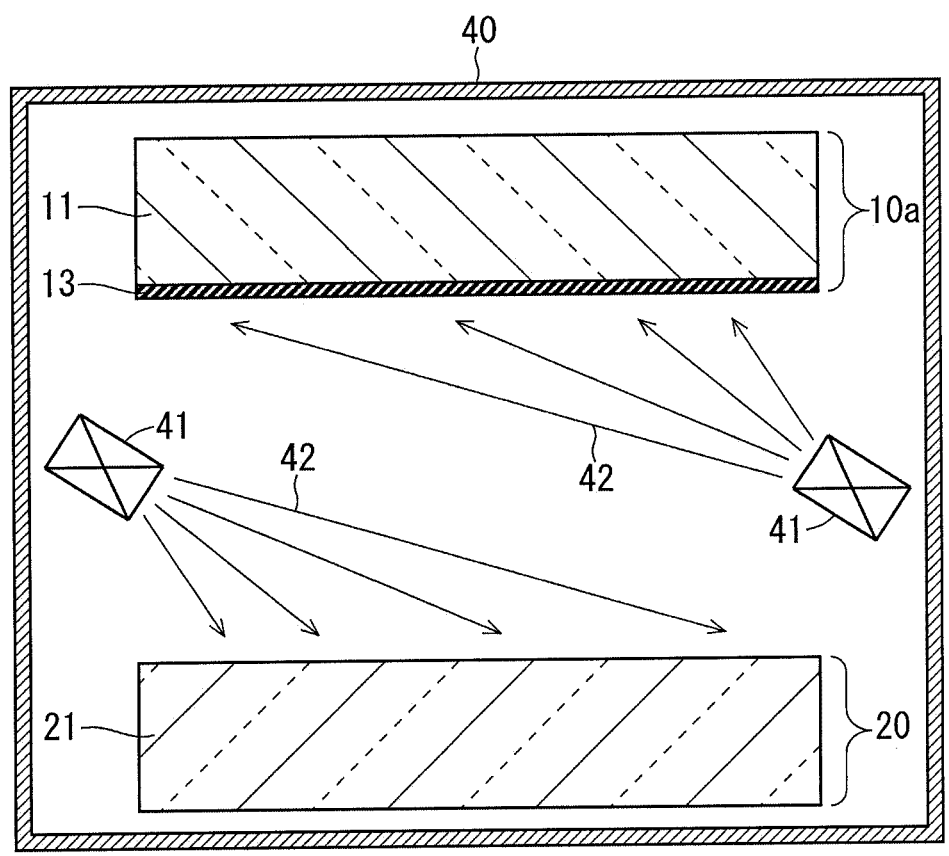

OPTICAL COMPONENT INCLUDING A TRANSLUCENT SUBSTRATE FOR ADJUSTABLE LIGHT SCATTERING AND LIGHTING DEVICE INCLUDING THE SAME

BACKGROUND OF THE INVENTION

Technical Field of the Invention

The present invention relates to an optical component and a lighting device, and more particularly, to an optical component including a phosphor substrate, and a lighting device including the optical component.

BACKGROUND ART

According to WO2011/141377 (Patent Document 1), a headlight module including a support for supporting a phosphor and a radiation source for electromagnetic radiation to the phosphor is disclosed. The support is exemplified by polycrystalline alumina ceramics or sapphire. Both materials are suitable for application to a headlight, which is a lighting device that is prone to increase in temperature and unevenness in temperature distribution, in terms of the materials having high heat resistance and high thermal conductivity. As a phosphor, yttrium aluminum garnet (YAG) doped with cerium (Ce) is exemplified. A blue light emitting laser is exemplified as a radiation source. The blue laser light passes through a yellow phosphor and is converted into white light due to the complementary color effect thereof. This allows the headlight module to emit white light.

According to Japanese Patent Application Laid-Open No. 2016-119361 (Patent Document 2), a luminance device including a phosphor as a wavelength conversion member is disclosed. A phosphor in a powder form which is dispersed in binder can be used. Further, it is also described that a single crystal or a polycrystal alone can be used as an alternative form and in that case, light scattering at the interface between the phosphor and the binder due to the difference in refractive index can be eliminated.

PRIOR ART DOCUMENTS

Patent Documents

[Patent Document 1] WO2011/141377
[Patent Document 2] Japanese Patent Application Laid-Open No. 2016-119361

SUMMARY

Problem to be Solved by the Invention

In luminance devices, it may be desirable for the light to be moderately scattered. For example, in the case of a headlight using a blue laser as a light source, if the light scattering is too small, blueish light rather than white light is strongly emitted along the traveling direction of the unscattered blue laser light. For this reason, the illumination light from the headlight has strong color unevenness. On the other hand, if the light scattering is too large, the light attenuation becomes large, and the output of the illumination light is reduced.

The degree to which light is scattered differs depending on whether the phosphor is in a dispersed form in a binder, a polycrystalline form or a single crystal form. Specifically, the degree to which light is scattered is large in the case of a phosphor dispersed in a binder, moderate in the case of a polycrystalline phosphor, and small in the case of a single crystal phosphor. It is not always possible to arbitrarily select one form among the three forms of phosphors. For example, in a phosphor dispersed in a binder, at high temperatures, the internal quantum efficiency tends to decrease, and the binder tends to deteriorate in particular when the binder is an organic substance. If the lighting device is of high brightness such as a headlight and a light source for a projector, the temperature is likely to rise, and thus the phosphor dispersed in the binder may be unsuitable for the above reasons. On the other hand, in single crystal phosphor, the decrease in internal quantum efficiency is relatively small even at high temperatures of about 300° C. For this reason, applying it to high luminance uses is under consideration. However, single crystal phosphor is generally produced by the Czochralski method, so there is a difficulty in producing large crystals. There is also a drawback in single crystal phosphor in that the concentrations of the additional activator differ in the vertical direction of the crystals. On the other hand, it is easy to obtain a large polycrystal such as ceramics, and the concentration difference of the additional activator does not easily occur. In addition, recently, the one comparable to the temperature characteristic and the transmission characteristic of single crystal has been proposed. Thus, in high brightness applications, there is a difficulty in adjusting the degree of light scattering by selection of phosphor form.

When light passes not only through the phosphor but also the support thereof, scattering of light occurs not only in the phosphor but also in the support that mechanically holds the phosphor. Therefore, even if the degree of light scattering in the phosphor cannot be sufficiently adjusted, if the degree of light scattering in the support can be sufficiently adjusted, the degree of light scattering as a whole can be optimized. However, in the prior art, alternatives of the support is generally limited to two: polycrystal which scatters light significantly or single crystal which does not scatter much light. Therefore, the degree of light scattering in the support cannot be adjusted arbitrarily.

The present invention has been made to solve the problems as described above, and one object of the present invention is to provide an optical component capable of arbitrarily adjusting the degree of light scattering in a support holding a phosphor. Another object of the present invention is to provide a lighting device capable of appropriately scattering light from a light source.

Means to Solve the Problem

An optical component according to the present invention includes a first substrate including a phosphor substrate, and a second substrate including a translucent substrate and supporting the first substrate. The translucent substrate has a polycrystalline structure with orientation.

The lighting device according to the present invention includes an optical component and a light source. The optical component includes a first substrate including a phosphor substrate, and a second substrate including a translucent substrate and supporting the first substrate. The translucent substrate has a polycrystalline structure with orientation. The light source is configured to provide light passing through both of the first substrate and the second substrate of the optical component.

Detailed Description of the Invention

According to the optical component of the present invention, the phosphor substrate is supported by the translucent substrate having a polycrystalline structure with orientation. Thereby, by adjusting the orientation of the translucent substrate, the degree of light scattering can be adjusted. That is, the degree of light scattering in the support supporting the phosphor can be arbitrarily adjusted.

According to the lighting device of the present invention, light from the light source passes not only through the first substrate but also through the second substrate. Thereby, by adjusting the orientation of the translucent substrate included in the second substrate, the degree of light scattering of the lighting device can be adjusted.

These and other objects, features, aspects and advantages of the present invention will become more apparent from the following detailed description of the present invention when taken in conjunction with the accompanying drawings.

BRIEF DESCRIPTION OF DRAWINGS

FIG. 5 A sectional view schematically illustrating a first step of a manufacturing method of the optical component of FIG. 3.

DESCRIPTION OF EMBODIMENTS

Embodiment 1

(Configuration)

Figure 1:
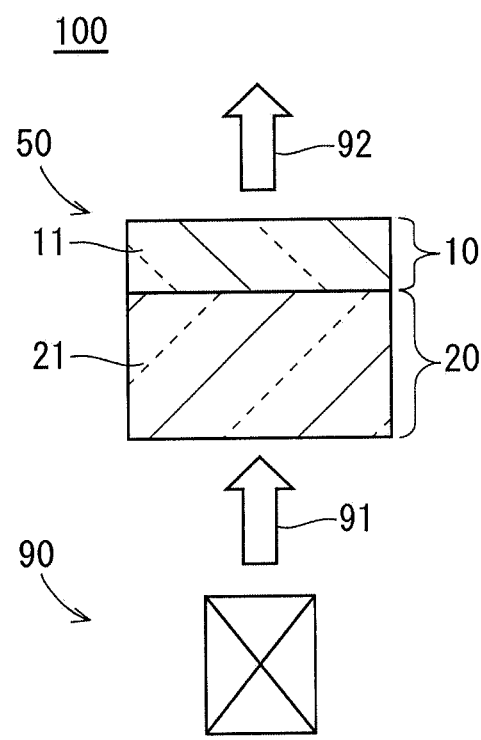
FIG. 1 A sectional view schematically illustrating a configuration of a lighting device including an optical component according to Embodiment 1 of the present invention.

Referring to FIG. 1, a lighting device 100 includes a light source 90, a wavelength conversion member 50 (optical component). The light source 90 is, for example, a semiconductor laser. The wavelength conversion member 50 converts a light wavelength by the phosphor. Excitation light 91 from the light source is converted into illumination light 92 by passing through the wavelength conversion member 50. For example, the excitation light 91 is blue light or ultraviolet light, and the illumination light 92 is white light (synthesized light of blue light being transmitted light of the excitation light 91 and yellow light being converted light wavelength-converted by the phosphor).

The wavelength conversion member 50 includes a supported substrate 10 (first substrate) and a supporting substrate 20 (second substrate) that mechanically holds the supported substrate 10. When a lighting device 100 is used, light passing through both the supported substrate 10 and the supporting substrate 20 is provided by the light source 90. The supported substrate 10 includes a phosphor substrate 11, and in Embodiment 1, the supported substrate 10 is the phosphor substrate 11. The supporting substrate 20 includes a translucent substrate 21, and in Embodiment 1, the supporting substrate 20 is the translucent substrate 21.

The phosphor substrate 11 has a polycrystalline structure. It is preferable that the phosphor substrate 11 does not substantially contain a binder such as glass or resin. That is, the phosphor substrate 11 is not the one in which a number of phosphor particles are bound by a binder, but the one composed by continuously providing polycrystalline structures themselves, and typically, ceramics is preferable. Preferably, the thermal conductivity of the translucent substrate 21 is higher than the thermal conductivity of the phosphor substrate 11. The phosphor substrate 11 is made of, for example, YAG doped with an additional activator such as Ce.

The translucent substrate 21 is a substrate having translucency and, preferably, is a substantially transparent substrate. The linear transmittance of the translucent substrate 21 is preferably about 70% or more per 0.5 mm in thickness in the wavelength range used by the lighting device 100. The thickness of the translucent substrate 21 is, for example, about 1 mm. It is preferable that the translucent substrate 21 have a substantially constant refractive index in the horizontal direction (lateral direction in the drawing). The translucent substrate 21 preferably has substantially no pores. Microscopic observation of about 5000 magnifications, for example, is conducted to observe the pores. The surface to be observed is preferably finished by polishing using ion milling so as to prevent shedding from occurring when the surface to be observed is prepared.

The translucent substrate 21 is preferably mainly composed of alumina ($Al_2O_3$) or aluminum nitride. 99% or more is preferable as for the ratio for which the main component accounts among the components of the translucent substrate 21, and 99.99% or more is more preferable. Preferably, the linear thermal expansion coefficient of the translucent substrate 21 is within ±30% of the linear thermal expansion coefficient of the phosphor substrate 11. Here, the linear thermal expansion coefficient is in the in-plane direction (lateral direction in the figure).

The translucent substrate 21 is ceramics (sintered body) and has a polycrystalline structure with orientation. The orientation direction is preferably along the thickness direction (vertical direction in the drawing) of the translucent substrate 21. In other words, the orientation direction is preferably along the stacking direction of the supported substrate 10 and the supporting substrate 20. The orientation axis of a crystal is typically the c-axis in crystallography.

The orientation of the polycrystalline structure of the translucent substrate 21 preferably has an orientation degree of 10% or more and 99% or less. The orientation degree can be measured by the Lotgering method using X-ray diffraction. The measurement sample can be obtained by smoothly polishing the substantially horizontal cross section (the cross section substantially perpendicular to the thickness direction) of the translucent substrate 21. By irradiating the polished surface with X-rays, an X-ray diffraction profile is obtained. Hereinafter, the case where the translucent substrate 21 is made of alumina will be described in detail.

Assuming that the angle between the incident X-ray direction and the diffracted X-ray direction is 2θ and a CuKα ray is used as X-ray, the X-ray diffraction profile is acquired, for example, in the range of 2θ=20° to 70°. From this profile, data of intensity $I_S$(hkl) corresponding to each of the (hkl) planes is read. From this data, the c-plane orientation degree is calculated as follows.

$$\frac{P - P_0}{1 - P_0} \times 100 [\%] \qquad \text{[Expression 1]}$$

The intensity ratio $P_0$ and the intensity ratio P in the above expression are calculated by the following expressions.

$$P_0 = \frac{I_0(006)}{\sum I_0(hkl)} \qquad \text{[Expression 2]}$$

$$P = \frac{I_S(006)}{\sum I_S(hkl)} \qquad \text{[Expression 3]}$$

The intensity ratio P is a ratio in which the intensity $I_S$ (006) of the (006) plane corresponding to the c-plane for the measurement sample is normalized by the sum of the intensities $I_S$ (hkl) for all (hkl) in the measurement range. The intensity ratio $P_0$ is a ratio in which the intensity $I_0$ (006) of the (006) plane corresponding to the c-plane for non-oriented alumina is normalized by the sum of the intensities $I_0$ (hkl) for all (hkl) in the measurement range. The intensity ratio $P_0$ can be calculated from No. 46-1212 of Joint Committee on Powder Diffraction Standards (JCPDS) card for standard α-alumina as non-oriented alumina. As an X-ray diffraction apparatus, for example, "RINT-TTR III" manufactured by Rigaku Corporation can be used. As a setting condition of the X-ray source, for example, a condition of 50 kV voltage and 300 mA current can be used.

General polycrystalline alumina has no orientation, and has substantially 0% orientation. On the other hand, the degree of orientation of polycrystalline alumina to which orientation is intentionally imparted can be controlled from about 1% to nearly 100%. In order to obtain orientation, for example, the Templated Grain Growth (TGG) method using a raw material containing plate-like alumina particles is used. The degree of orientation can be arbitrarily adjusted by adjusting the compounding ratio of the plate-like alumina particles and the normal non-plate-like alumina particles in the raw material. The thickness of the plate-like alumina particles is preferably about 1.5 μm or more and about 20 μm or less in order to obtain both a high degree of orientation and fineness.

Figure 2:
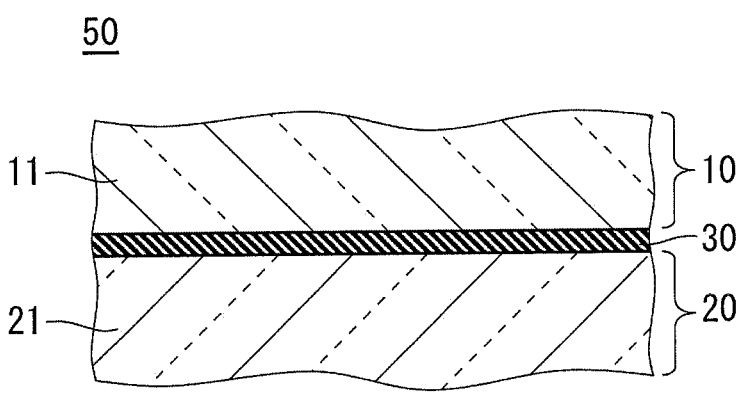
FIG. 2 A partial enlarged view of FIG. 1 and partial sectional view schematically illustrating the vicinity of a bonding layer between a supported substrate and a supporting substrate in the optical component.

Referring to FIG. 2, the wavelength conversion member 50 includes a bonding layer 30 between the supported substrate 10 and the supporting substrate 20, and this is microscopically observed with an electron microscope or the like. The bonding layer 30 is an interface layer formed by direct bonding between the supported substrate 10 and the supporting substrate 20. Diffusion of atoms occurs at the time of direct bonding; therefore, the bonding layer 30 includes at least one kind of element included on the surface (lower surface in the drawing) of the supported substrate 10 facing the supporting substrate 20 and at least one kind of element included on the surface (upper surface in the drawing) of the supporting substrate 20 facing the supported substrate 10. In Embodiment 1 in particular, the bonding layer 30 is an interface layer formed by direct bonding between the phosphor substrate 11 and the translucent substrate 21. Therefore, the bonding layer 30 includes at least one kind of element included in the phosphor substrate 11 and at least one kind of element included in the translucent substrate 21. The thickness of the bonding layer 30 is so small and the bonding layer 30 hardly impedes the propagation of light passing therethrough. The thickness of the bonding layer 30 is preferably about 1 nm or more and about 100 nm or less, and more preferably 1 nm or more and 10 nm or less.

Note that, strictly speaking, the bonding layer 30 is present; therefore, it can be said that the phosphor substrate 11 is supported by the translucent substrate 21 via the bonding layer 30.

(Effects)

According to the wavelength conversion member 50 of Embodiment 1, the phosphor substrate 11 is supported by the translucent substrate 21 having a polycrystalline structure with orientation. Thereby, by adjusting the orientation of the translucent substrate 21, the degree of light scattering can be adjusted. That is, the degree of light scattering in the support supporting the phosphor can be arbitrarily adjusted.

Further, in Embodiment 1, the phosphor substrate 11 has a polycrystalline structure. Thus, the phosphor substrate 11 moderately scatters light as compared to when the phosphor is a single crystal and when the phosphor is dispersed in the binder. In this case, in order to make the light scattering by the whole of the phosphor substrate 11 and the translucent substrate 21 appropriate, it may be required that the translucent substrate 21 scatters light to an intermediate degree. According to Embodiment 1, the translucent substrate 21 has a polycrystalline structure with orientation. Thereby, the translucent substrate 21 can moderately scatter light as compared to the case of the single crystal structure and the case of the non-oriented polycrystalline structure.

The phosphor substrate 11 is not limited to the one having a polycrystalline structure. The effect that the degree of light scattering can be adjusted by adjusting the orientation of the polycrystalline structure of the translucent substrate 21 can be obtained regardless of the configuration of the phosphor substrate 11. Therefore, as a modification, the phosphor substrate 11 may have a single crystal structure. In this case, by reducing the degree of orientation of the translucent substrate 21, insufficient light scattering is prevented.

Preferably, the thermal conductivity of the translucent substrate 21 is higher than the thermal conductivity of the phosphor substrate 11. Thus, the heat exhaustion of the heat generated in the phosphor substrate 11 can be promoted. Therefore, deterioration in performance due to the temperature rise of the phosphor substrate 11 due to the heat generation can be suppressed.

The polycrystalline structure of the translucent substrate 21 preferably has an orientation degree of 10% or more and 99% or less. Thereby, the degree of light scattering in the translucent substrate 21 is sufficiently smaller than that in the case where the polycrystalline structure of the translucent substrate 21 is non-oriented, and the degree of light scattering in the translucent substrate 21 is sufficiently large than that in the case where the translucent substrate 21 is a single crystal. It should be noted that, from the viewpoint of increasing the thermal conductivity of the translucent substrate 21, the orientation degree is preferably 90% or more.

The bonding layer 30 includes at least one kind of element included on the surface of the supported substrate 10 facing the supporting substrate 20 and at least one kind of element included on the surface of the supporting substrate 20 facing the supported substrate 10. Such a bonding layer 30 can be formed by direct bonding as described above. By using direct bonding, obstruction of heat conduction from the supported substrate 10 to the supporting substrate 20 at the bonding portion is suppressed.

Note that, as a modification, a method other than direct bonding may be used to bond the supported substrate 10 and the supporting substrate 20. In that case, a layer for bonding different from the bonding layer 30 is provided.

Preferably, the linear thermal expansion coefficient of the translucent substrate 21 is within ±30% of the linear thermal expansion coefficient of the phosphor substrate 11. Thus, occurrence of cracking of the phosphor substrate 11 due to the difference in thermal expansion can be prevented. The remarkable effect is obtained particularly in the case where the difference in thickness is large, like when the thickness of the phosphor substrate 11 is about 100 μm or less and the thickness of the translucent substrate 21 is 1 mm or more.

According to the lighting device 100 of Embodiment 1, the light from the light source 90 passes through not only the supported substrate 10 but also the supporting substrate 20. Thereby, by adjusting the orientation of the translucent substrate 21 included in the supporting substrate 20, the degree of light scattering of the lighting device 100 can be adjusted. The degree of scattering is not excessively small; therefore, it is avoidable that the unscattered component of the excitation light 91 is strongly emitted in a specific direction (upward in FIG. 1). Therefore, the color unevenness of the illumination light 92 is suppressed. In particular, when a laser is used as the light source 90, color unevenness generally tends to occur, so the above effect is remarkable. On the other hand, the degree of scattering is not excessively large; therefore, excessive attenuation of light can be avoided. Therefore, the reduction in output of the illumination light 92 due to scattering is suppressed. From the above, increase of the output is ensured while suppressing color unevenness.

Embodiment 2

(Configuration)

Figure 3:
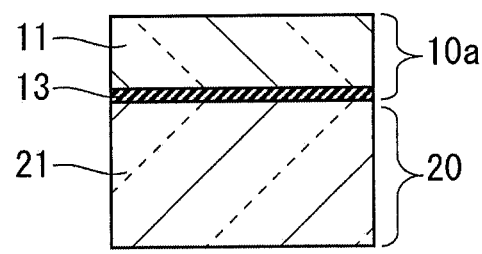
FIG. 3 A sectional view schematically illustrating a configuration of an optical component according to Embodiment 2 of the present invention.

Referring to FIG. 3, the wavelength conversion member 50a (optical component) of Embodiment 2 includes a supported substrate 10a (first substrate) instead of the supported substrate 10 (FIG. 1). The supported substrate 10a includes an intermediate layer 13 facing the supporting substrate 20. Therefore, the bonding layer 11 is supported by the phosphor substrate 21 via the intermediate layer 13. The intermediate layer 13 is made of a material different from the material of the phosphor substrate 11. The intermediate layer 13 is a layer having translucency, and is preferably substantially transparent. Preferably, the thickness of the intermediate layer 13 is 1 μm or less. Preferably, the thermal conductivity of the intermediate layer 13 is higher than the thermal conductivity of the phosphor substrate 11. The material of the intermediate layer 13 is preferably oxide, for example, alumina ($Al_2O_3$) or tantalum pentoxide ($Ta_2O_5$).

Figure 4:
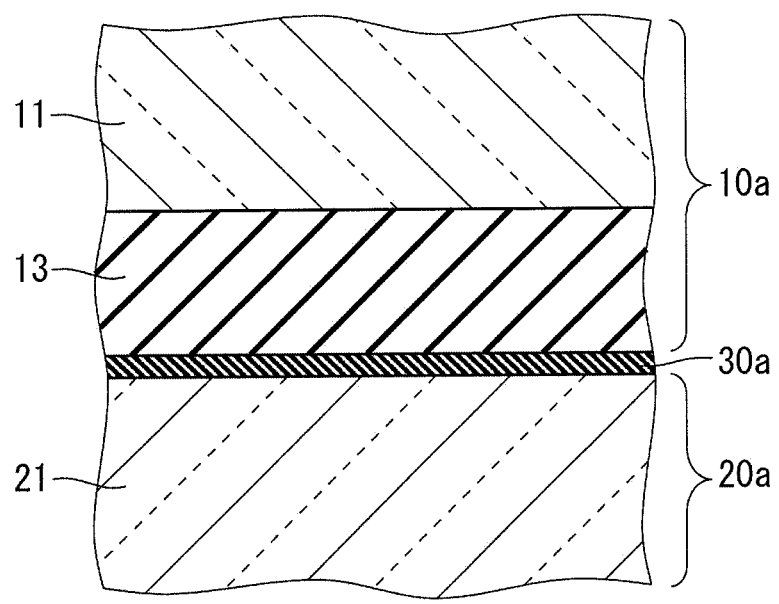
FIG. 4 A partial enlarged view of FIG. 3 and partial sectional view schematically illustrating the vicinity of a bonding layer between a supported substrate and a supporting substrate in the optical component.

Referring to FIG. 4, the wavelength conversion member 50a of Embodiment 2 includes a bonding layer 30a instead of the bonding layer 30 (FIG. 2). The bonding layer 30a is an interface layer formed by direct bonding between the supported substrate 10a and the supporting substrate 20. Therefore, the bonding layer 30a includes at least one kind of element included on the surface (lower surface in the drawing) of the supported substrate 10a facing the supporting substrate 20 and at least one kind of element included on the surface (upper surface in the drawing) of the supporting substrate 20 facing the supported substrate 10a. In Embodiment 2 in particular, the bonding layer 30a is an interface layer formed by direct bonding between the intermediate layer 13 and the translucent substrate 21. Therefore, the bonding layer 30a includes at least one kind of element included in the intermediate layer 13 and at least one kind of element included in the translucent substrate 21. Strictly speaking, the bonding layer 30a is present; therefore, it can be said that the phosphor substrate 11 is supported by the translucent substrate 21 via the intermediate layer 13 and the bonding layer 30a. Except for the above, the bonding layer 30a is similar to the bonding layer 30 (FIG. 2).

The configuration other than the above is substantially the same as that of the above-described Embodiment 1, therefore, the same or corresponding elements are denoted by the same reference numerals, and description thereof will not be repeated.

(Manufacturing Method)

The manufacturing method of the wavelength conversion member 50a is described below with reference to FIGS. 5 to 8.

Referring to FIG. 5, the intermediate layer 13 is formed on the phosphor substrate 11 (on the lower surface in the drawing). Thus, the supported substrate 10a having the phosphor substrate 11 and the intermediate layer 13 is obtained. In addition, the translucent substrate 21 as the supporting substrate 20 is prepared. The supported substrate 10a and the supporting substrate 20 are transported into the vacuum chamber 40. The particle beam 42 is irradiated from the particle beam generator 41 to each of the surface of the intermediate layer 13 of the supported substrate 10a and the surface of the supporting substrate 20. This makes both surfaces suitable for direct bonding. For example, the particle beam generator 41 is an ion gun, and the particle beam 42 is an ion beam. The ion beam is typically an argon (Ar) ion beam. Plasma may be irradiated instead of the particle beam.

Figure 6:
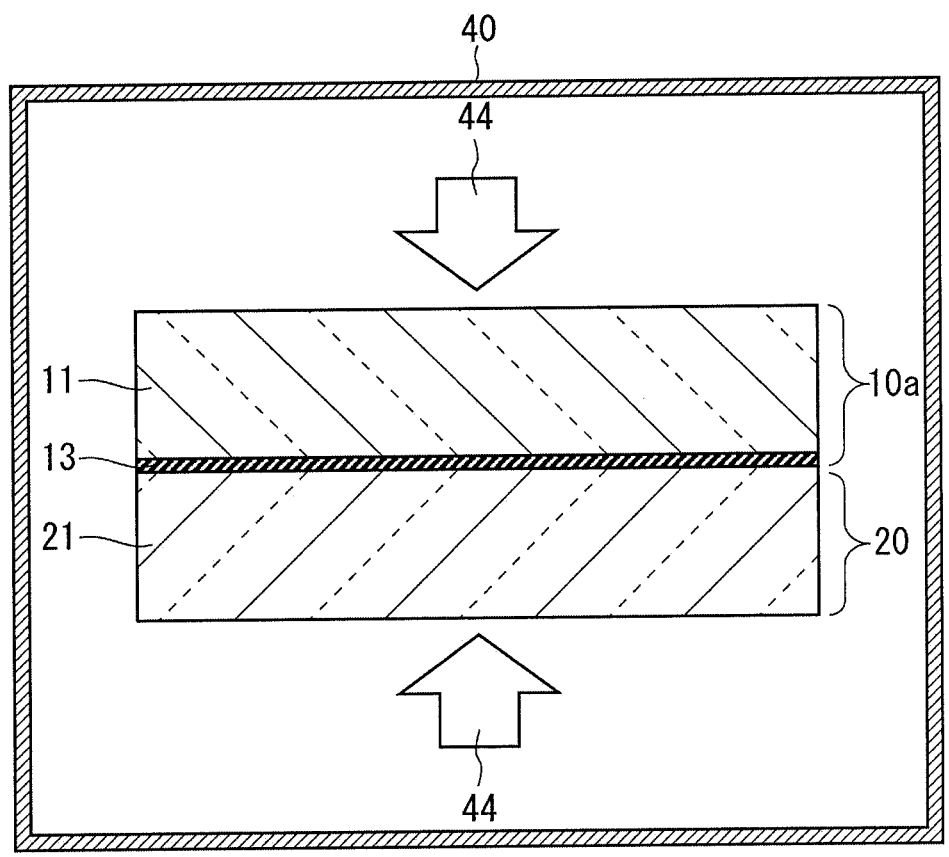
FIG. 6 A sectional view schematically illustrating a second step of the manufacturing method of the optical component of FIG. 3.

Further, referring to FIG. 6, the above surfaces in pair are brought into contact with one another. Then, the supported substrate 10a and the supporting substrate 20 are mutually pressed by a load 44. Therefore, the supported substrate 10a and the supporting substrate 20 are mutually bonded by the direct bonding. The bonding temperature may be a normal temperature or higher than the normal temperature. The diffusion of substances is particularly significantly promoted if high temperatures, in particular temperatures about 800° C. or higher, is used. Therefore, the smoothness of the surface to be bonded is not strictly required than in the case of the normal temperature. Therefore, if a high bonding temperature is acceptable, it can be used to reduce cost or increase yield.

Figure 7:
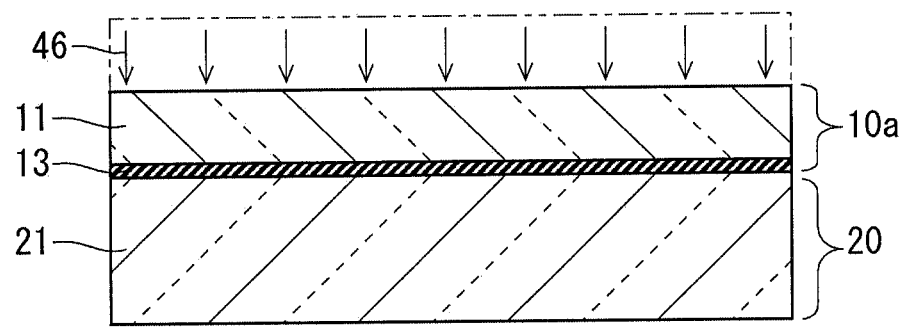
FIG. 7 A sectional view schematically illustrating a third step of the manufacturing method of the optical component of FIG. 3.
Figure 8:
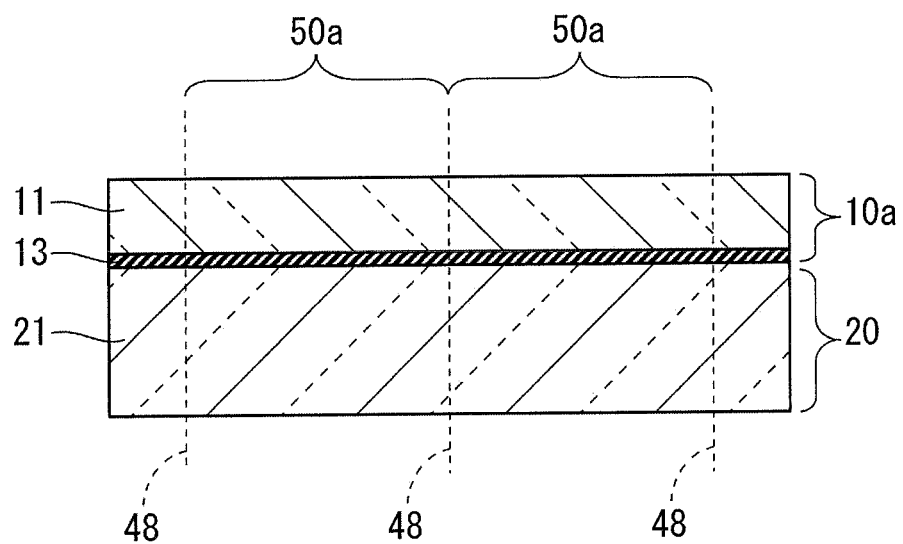
FIG. 8 A sectional view schematically illustrating a fourth step of the manufacturing method of the optical component of FIG. 3.

Referring to FIG. 7, the thickness of the phosphor substrate 11 is reduced by polishing 46, if necessary. Referring to FIG. 8, one or more wavelength conversion members 50a are cut out along the dicing line 48 from the laminated body of the supported substrate 10a and the supporting substrate 20 obtained by the above bonding.

Thus, the wavelength conversion member 50a (FIG. 3) is obtained. It should be noted that, if the above manufacturing method is implemented without forming the intermediate layer 13, the wavelength conversion member 50 (FIG. 1: Embodiment 1) will be obtained.

(Effects)

The same effects as above-described Embodiment 1 are also obtained with Embodiment 2.

Further, according to Embodiment 2, the supported substrate 10a includes the intermediate layer 13 facing the supporting substrate 20, and the intermediate layer 13 is made of a material different from the material of the phosphor substrate 11. Thus, the material of the surface of the supported substrate 10*a* facing the supporting substrate 20 can be made suitable for bonding with the supporting substrate 20. This facilitates the bonding of the supported substrate 10*a* and the supporting substrate 20, and in particular, facilitates the direct bonding, in which the combination of materials is significant. It should be noted that the material of the intermediate layer 13 may be the same as the material of the translucent substrate 21, and in that case, direct bonding is more readily implemented.

(Modification)

Figure 9:
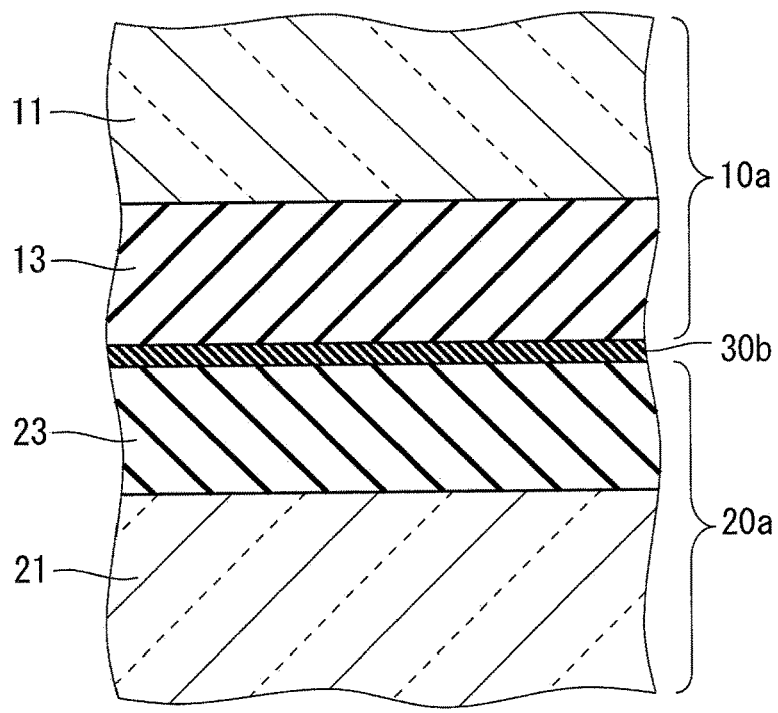
FIG. 9 Modification of FIG. 4.

Referring to FIG. 9, the wavelength conversion member 50*b* (optical component) of Modification includes a supporting substrate 20*a* (second substrate) instead of the supporting substrate 20 (FIG. 3). The supporting substrate 20*a* includes an intermediate layer 23 facing the supported substrate 10*a*. Therefore, the phosphor substrate 11 is supported by the translucent substrate 21 via the intermediate layer 13 and the intermediate layer 23. The intermediate layer 23 is made of a material different from the material of the translucent substrate 21. The intermediate layer 23 is a layer having translucency, and is preferably substantially transparent. Preferably, the thickness of the intermediate layer 23 is 1 μm or less. Preferably, the thermal conductivity of the intermediate layer 23 is higher than the thermal conductivity of the phosphor substrate 11. The material of the intermediate layer 23 is preferably oxide, for example, alumina or tantalum pentoxide.

Further, the wavelength conversion member 50*b* includes a bonding layer 30*b* instead of the bonding layer 30*a* (FIG. 4). The bonding layer 30*b* is an interface layer formed by direct bonding between the supported substrate 10*a* and the supporting substrate 20*a*. Therefore, the bonding layer 30*b* includes at least one kind of element included on the surface (lower surface in the drawing) of the supported substrate 10*a* facing the supporting substrate 20*a* and at least one kind of element included on the surface (upper surface in the drawing) of the supporting substrate 20*a* facing the supported substrate 10*a*. In Modification in particular, the bonding layer 30*b* is an interface layer formed by direct bonding between the intermediate layer 13 and the intermediate layer 23. Therefore, the bonding layer 30*b* includes at least one kind of element included in the intermediate layer 13 and at least one kind of element included in the intermediate layer 23. Strictly speaking, the bonding layer 30*b* is present; therefore, it can be said that the phosphor substrate 11 is supported by the translucent substrate 21 via the intermediate layer 13, the intermediate layer 23, and the bonding layer 30*b*. Except for the above, the bonding layer 30*b* is similar to the bonding layer 30*a* (FIG. 4).

Substantially the same effects as Embodiment 2 are also obtained with Modification. It should be noted that the material of the intermediate layer 23 may be the same as the material of the intermediate layer 13, and in that case, direct bonding is more readily implemented.

WORKING EXAMPLES

The examination results for Working Examples 1 to 3 of the wavelength conversion member 50*a* (FIG. 3) and Comparative Examples 1 and 2 are summarized in the following table. In "comprehensive evaluation" in the table, "passed" is denoted for Examples satisfying the case in which the output of the illumination light 92 (FIG. 1) was 2200 lm or more and no color unevenness was found in the illumination light 92, and "rejected" is denoted for Examples not satisfying the case.

TABLE 1

|  |  | Example 1 | Example 2 | Example 3 | Comparative Example 1 | Comparative Example 2 |
|---|---|---|---|---|---|---|
| translucent substrate | material | oriented polycrystalline alumina | oriented polycrystalline alumina | oriented polycrystalline alumina | single-crystal sapphire | non-oriented polycrystalline alumina |
|  | c-plane orientation degree | 60% | 10% | 99% | 100% | 0% |
|  | linear transmittance | 70% | 50% | 84% | 85% | 45% |
| output of illumination light |  | 2800 lm | 2200 lm | 2550 lm | 2500 lm | 2000 lm |
| color unevenness of illumination light |  | not found | not found | not found | found | not found |
| comprehensive evaluation |  | passed | passed | passed | rejected | rejected |

Hereinafter, each example will be described in detail.

Working Example 1

A polycrystalline YAG substrate (made by Konoshima Chemical Co., Ltd.) doped with Ce atoms was prepared as the phosphor substrate 11 (FIG. 5). An alumina layer having a thickness of 0.5 μm was formed as the intermediate layer 13 (FIG. 5) on the phosphor substrate 11 by sputtering. The obtained layer has a surface roughness Ra of 0.5 nm. In addition, a transparent alumina substrate having a thickness of 1 mm, the orientation degree of 60%, and a linear transmittance of 70% was prepared as the supporting substrate 20 (FIG. 5). The alumina layer and the transparent alumina substrate were directly bonded. Specifically, first, the argon ion beam was irradiated on the both surfaces. Next, the both were brought into contact under vacuum at the normal temperature, and the load 44 (FIG. 6) was applied. That is, bonding was performed. According to microscopic observation, no bubbles were observed at the bonding surface. Next, polishing 46 (FIG. 7) reduced the thickness of the phosphor substrate 11 to 100 μm within errors of ±0.25 μm. The polishing 46 was performed with accuracy of optical polishing. Specifically, grinder grinding, lapping and chemical mechanical polishing (CMP) were sequentially performed. Next, a wavelength conversion member 50*a* was cut out with a size of 3 mm square using a dicing unit. In the obtained wavelength conversion member 50*a*, neither chipping nor cracking was observed.

As a light source 90 (FIG. 1), a GaN-based blue laser device with an output of 10 W and a wavelength of 450 nm was prepared. The excitation light 91 (FIG. 1) generated by using the device was irradiated on the wavelength conversion member 50*a* (FIG. 1). The output and the color unevenness of the illumination light 92 (FIG. 1) obtained by passing this light through the wavelength conversion member 50*a* were evaluated. As shown in the above table, the output was 2800 lm, and no color unevenness was found. Therefore, the wavelength conversion member 50*a* was determined to be "passed".

Incidentally, the measurement of the output of the illumination light 92 was performed in accordance with the stipulation of "JIS C 7801" in Japanese Industrial Standards (JIS). Specifically, the measurement was performed by time averaging of the total luminous flux from the wavelength conversion member 50*a*. The measurement of total luminous flux was performed using an integrating sphere (sphere photometer). The light source to be measured and the standard light source for which the total luminous flux had been valued were turned on at the same position, and the measurement was performed by comparing the two.

Color unevenness was evaluated by the chromaticity diagram obtained using the luminance distribution measuring device. In the chromaticity diagram, when the measurement result was in the range of median x: 0.3447±0.005, y: 0.3553±0.005, it was determined that there was no color unevenness, and otherwise, it was determined that there was color unevenness.

Working Example 2

A transparent alumina substrate having the orientation degree of 10% and the linear transmittance of 50% was prepared as the supporting substrate 20 (FIG. 5). The other manufacturing conditions were the same as in Working Example 1. As in Working Example 1, no bubbles were observed at the bonding surface, and neither chipping nor cracking was observed in the obtained wavelength conversion member 50*a*. As shown in the above table, the output of the illumination light 92 (FIG. 1) from the wavelength conversion member 50*a* was 2200 lm, and no color unevenness was found. Therefore, the wavelength conversion member 50*a* was determined to be "passed".

Working Example 3

A transparent alumina substrate having the orientation degree of 99% and the linear transmittance of 84% was prepared as the supporting substrate 20 (FIG. 5). The other manufacturing conditions were the same as in Working Example 1. As in Working Examples 1 and 2, no bubbles were observed at the bonding surface, and neither chipping nor cracking was observed in the obtained wavelength conversion member 50*a*. As shown in the above table, the output of the illumination light 92 (FIG. 1) from the wavelength conversion member 50*a* was 2550 lm, and no color unevenness was found. Therefore, the wavelength conversion member 50*a* was determined to be "passed".

Comparative Example 1

In Working Examples 1 to 3, oriented polycrystalline alumina was used as the translucent substrate constituting the supporting substrate 20 (FIG. 5); in Comparative Example 1, single crystal sapphire having the c-axis along the thickness direction was used. Therefore, it can be said that the c-plane orientation degree of the translucent substrate in Comparative Example 1 is 100%. The linear transmittance of single crystal sapphire was 85%. The other manufacturing conditions were the same as in Working Example 1. As in Working Examples 1 to 3, no bubbles were observed at the bonding surface, and neither chipping nor cracking was observed in the obtained wavelength conversion member. As shown in the above table, the output of the illumination light from the wavelength conversion member is 2500 lm, and color unevenness was found. The color unevenness is present; therefore, the wavelength conversion member was determined to be "rejected".

Comparative Example 2

In Working Examples 1 to 3, oriented polycrystalline alumina was used as the translucent substrate constituting the supporting substrate 20 (FIG. 5); in Comparative Example 2, non-oriented alumina is used. Therefore, it can be said that the c-plane orientation degree of the translucent substrate in Comparative Example 2 is 0%. The linear transmittance of non-oriented alumina was 45%. The other manufacturing conditions were the same as in Working Example 1. As in above Examples, no bubbles were observed at the bonding surface, and neither chipping nor cracking was observed in the obtained wavelength conversion member. As shown in the above table, the output of the illumination light from the wavelength conversion member was 2000 lm, and no color unevenness was found. The output was insufficient; therefore, the wavelength conversion member was determined to be "rejected".

(Another Working Example)

Figure 10:
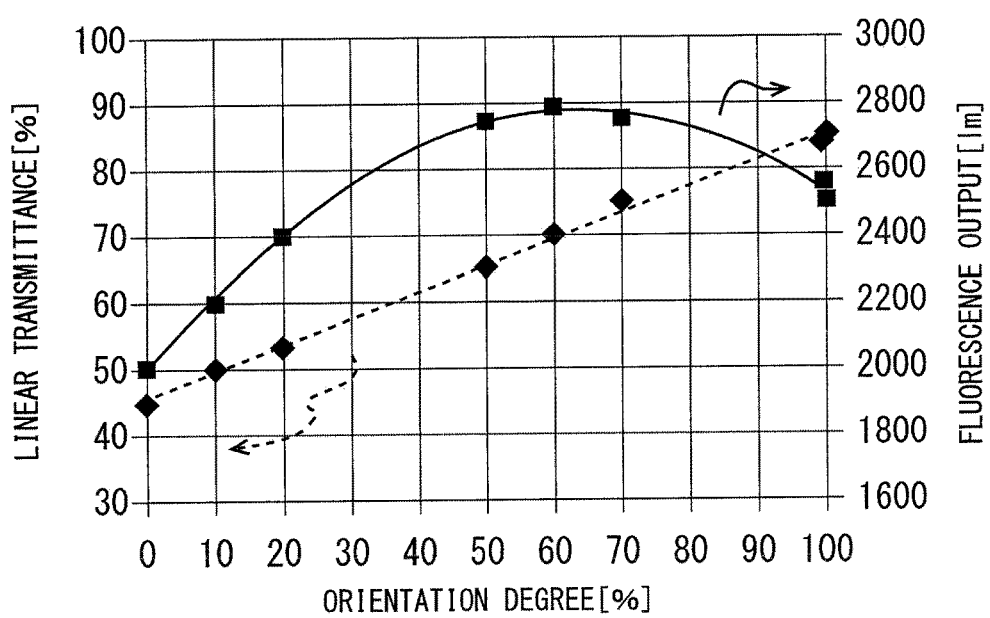
FIG. 10 A graph illustrating evaluation results about the optical component of Working Examples and Comparative Examples.

In addition to the above, the same examination as described above was conducted also in Working Examples in which transparent alumina substrates having orientation degrees of 20%, 50% and 70% were used. The evaluation results are summarized in the graph of FIG. 10.

(Examination on the Above Example)

In Comparative Example 1, color unevenness was found in the illumination light from the wavelength conversion member. The reason is considered to be that light scattering was insufficient because single crystal sapphire was used as the translucent substrate in Comparative Example 1. On the other hand, in other Examples, it is considered that the occurrence of color unevenness was suppressed because the light was sufficiently scattered. Therefore, in order to avoid the occurrence of color unevenness, it is considered preferable to use polycrystalline alumina instead of single crystal sapphire as the translucent substrate.

In Comparative Example 2, output of the illumination light from the wavelength conversion member was insufficient. The reason is considered to be that light scattering was excessive because non-oriented polycrystalline alumina was used as the translucent substrate in Comparative Example 2. On the other hand, in other Examples, it is considered that the reduction in the output of the illumination light was suppressed because the light was not excessively scattered. Therefore, in order to suppress the reduction in the output of the illumination light, it is considered preferable that the polycrystalline structure of the translucent substrate has orientation.

As described above, it is considered that excess or deficiency of light scattering can be avoided by the translucent substrate 21 having a polycrystalline structure with orientation. Then, thereby, it is considered that generation of color unevenness can be avoided and reduction in the output of the illumination light 92 can be suppressed.

While the invention has been described in detail, the foregoing description is in all aspects illustrative and not restrictive. It is understood that numerous other modifications and variations can be devised without departing from the scope of the invention.

EXPLANATION OF REFERENCE SIGNS 10, 10a supported substrate (first substrate)
11 phosphor substrate
13, 23 intermediate layer
20, 20a supporting substrate (second substrate)
21 translucent substrate
30, 30a, 30b bonding layer
40 vacuum chamber
41 particle beam generator
50, 50a, 50b wavelength conversion member (optical component)
90 light source
91 excitation light
92 illumination light
100 lighting device

The invention claimed is:

1. An optical component, which is configured for converting a wavelength of extraneous light and scattering the extraneous light, comprising:
    a first substrate including a phosphor substrate; and
    a second substrate including a translucent substrate and supporting the first substrate, the translucent substrate having a polycrystalline structure with orientation and mainly composed of alumina or aluminum nitride.

2. The optical component according to claim 1, wherein the phosphor substrate has a polycrystalline structure.

3. The optical component according to claim 1, wherein thermal conductivity of the translucent substrate is higher than thermal conductivity of the phosphor substrate.

4. The optical component according to claim 1, wherein the polycrystalline structure of the translucent substrate has an orientation degree of 10% or more and 99% or less.

5. The optical component according to claim 1, further comprising
    a bonding layer between the first substrate and the second substrate, the bonding layer including at least one kind of element contained on a surface of the first substrate facing the second substrate and at least one kind of element contained on a surface of the second substrate facing the first substrate.

6. The optical component according to claim 1, wherein the translucent substrate has a linear thermal expansion coefficient of within ±30% of a linear thermal expansion coefficient of the phosphor substrate.

7. The optical component according to claim 1, wherein the first substrate includes an intermediate layer facing the second substrate, and the intermediate layer is made of a material different from a material of the phosphor substrate.

8. A lighting device comprising:
    the optical component according to claim 1; and
    a light source configured to provide the extraneous light passing through both of the first substrate and the second substrate of the optical component.

9. The lighting device according to claim 8, wherein the light source includes a laser.

10. The optical component according to claim 1, wherein the translucent substrate has a linear transmittance 50% or more.

11. The lighting device according to claim 8, wherein the translucent substrate has a linear transmittance 50% or more.

* * * * *